United States Patent
Franke et al.

(12)

(10) Patent No.: US 11,131,420 B2
(45) Date of Patent: Sep. 28, 2021

(54) DISPLAY ARM TO HOUSING CONNECTORS

(71) Applicant: HEWLETT-PACKARD DEVELOPMENT COMPANY, L.P., Houston, TX (US)

(72) Inventors: Gregory C. Franke, Houston, TX (US); Chih Chien Chen, Taipei (CN); Wei Ju Chiang, Taipei (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 25 days.

(21) Appl. No.: 16/082,567

(22) PCT Filed: Jun. 26, 2017

(86) PCT No.: PCT/US2017/039259
§ 371 (c)(1),
(2) Date: Sep. 6, 2018

(87) PCT Pub. No.: WO2019/004997
PCT Pub. Date: Jan. 3, 2019

(65) Prior Publication Data
US 2021/0156506 A1    May 27, 2021

(51) Int. Cl.
*F16M 11/38* (2006.01)
*H05K 7/00* (2006.01)
(Continued)

(52) U.S. Cl.
CPC .......... *F16M 11/041* (2013.01); *F16M 11/38* (2013.01); *F16M 2200/028* (2013.01); *F16M 2200/08* (2013.01); *G06F 1/1601* (2013.01)

(58) Field of Classification Search
CPC .......... F16M 11/041; F16M 11/38; F16M 2200/028; F16M 2200/08; G06F 1/1601
See application file for complete search history.

(56) References Cited

U.S. PATENT DOCUMENTS 5,632,463 A * 5/1997 Sung .................... F16M 11/126
248/349.1
5,732,922 A     3/1998 Jeon
(Continued)

FOREIGN PATENT DOCUMENTS

| CN | 1062406 | 2/2001 |
|---|---|---|
| CN | 1959853 | 5/2007 |

(Continued)

OTHER PUBLICATIONS

VideoSecu ML531BE TV Wall Mount for most 22"-55" LED LCD Plasma Flat Screen Monitor up to 88 lb VESA 400x400 with Full Motion Swivel Articulating 20 in Extension Arm, HDMI Cable & Bubble Level WP5", Retrieved from internet—https://www.amazon.com/VideoSecu-ML531BE-Monitor-Articulating-Extension/dp/B000WYVBR0?psc=1&SubscriptionId=AKIAITV4IRVCT65A7MHA&linkCode=xm2&camp=2025&creative=165953&creativeASIN=B000WYVBR0, 2007, 1 Page.

*Primary Examiner* — Tan Le
(74) *Attorney, Agent, or Firm* — Conley Rose, P.C.

(57) ABSTRACT

In some examples, an apparatus includes a housing and a mounting plate to fixably attach to the housing. The mounting plate has a central axis, a first end, a second end opposite the first end, a first lateral side extending axially from the first end to the second end, and a second lateral side extending axially from the first end to the second end. The mounting plate includes a shoulder and a first receptacle to slidingly receive a first tab on an end of an arm coupled to a display. The shoulder extends laterally from the first lateral side to the second lateral side and the first receptacle extends axially into the shoulder.

15 Claims, 8 Drawing Sheets

(51) Int. Cl.
  *B60B 33/06* (2006.01)
  *G06F 11/16* (2006.01)
  *F16M 11/04* (2006.01)
  *G06F 1/16* (2006.01)

(56) References Cited

U.S. PATENT DOCUMENTS

| | | | | |
|---|---|---|---|---|
| 5,895,022 | A * | 4/1999 | Kim | F16M 11/2014 |
| | | | | 248/398 |
| 6,024,336 | A * | 2/2000 | Lin | F16M 11/126 |
| | | | | 248/371 |
| 6,081,420 | A * | 6/2000 | Kim | G06F 1/16 |
| | | | | 361/679.22 |
| 6,921,057 | B2 * | 7/2005 | Chen | F16M 11/08 |
| | | | | 248/349.1 |
| 7,168,665 | B2 * | 1/2007 | Hong | F16M 11/28 |
| | | | | 248/125.1 |
| 7,195,214 | B2 | 3/2007 | Lee et al. | |
| 7,424,991 | B2 | 9/2008 | Kim et al. | |
| 7,555,581 | B2 | 6/2009 | Martin et al. | |
| 9,042,092 | B2 * | 5/2015 | Lu | F16M 11/041 |
| | | | | 361/679.29 |
| 9,298,213 | B2 | 3/2016 | Khor et al. | |
| 2003/0086028 | A1 | 5/2003 | Ma et al. | |
| 2005/0139745 | A1 | 6/2005 | Liao et al. | |
| 2008/0067314 | A1 | 3/2008 | Li et al. | |
| 2015/0102185 | A1 | 4/2015 | Ho | |

FOREIGN PATENT DOCUMENTS

| | | |
|---|---|---|
| CN | 2922064 Y | 7/2007 |
| CN | 101093732 | 12/2007 |
| CN | 201336114 | 10/2009 |
| CN | 201751664 | 2/2011 |
| CN | 102184677 | 9/2011 |
| CN | 103925461 | 7/2014 |
| CN | 104141863 | 11/2014 |
| CN | 205427707 U | 8/2016 |
| DE | 29800370 | 1/1998 |
| GB | 2327039 A | 1/1999 |
| KR | 960006265 A | 2/1996 |
| TW | 284184 | 12/2005 |
| TW | 200821673 | 5/2008 |

* cited by examiner

DISPLAY ARM TO HOUSING CONNECTORS

BACKGROUND

Various electronic devices, such as stand-alone monitors, portable computers, desktop computers, and all-in-one (AiO) desktop computers include a display supported by an arm. Different types of connectors may be used to attach the arm to other structures.

BRIEF DESCRIPTION OF THE DRAWINGS

Various examples are described below referring to the following figures.

DETAILED DESCRIPTION

In the following discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. In addition, as used herein, the terms "axial" and "axially" generally refer to positions along or parallel to a central or longitudinal axis (e.g., central axis of a body or a port), while the terms "lateral" and "laterally" generally refer to positions located or spaced to the side of the central or longitudinal axis.

Connectors used to attach display arms to support structures may provide varying degrees of functionality (e.g., the ability to adjust the orientation of a display at an end of the display arm). In some cases, it may be desirable to attach the display arm to a different support structure. Thus, examples described herein are directed to apparatuses for removably coupling display arms and associated displays to support structures, thereby allowing interchangeability of the support structures. In addition, examples described herein allow display arms to be removably coupled to a support structure with relative ease.

Figure 1:
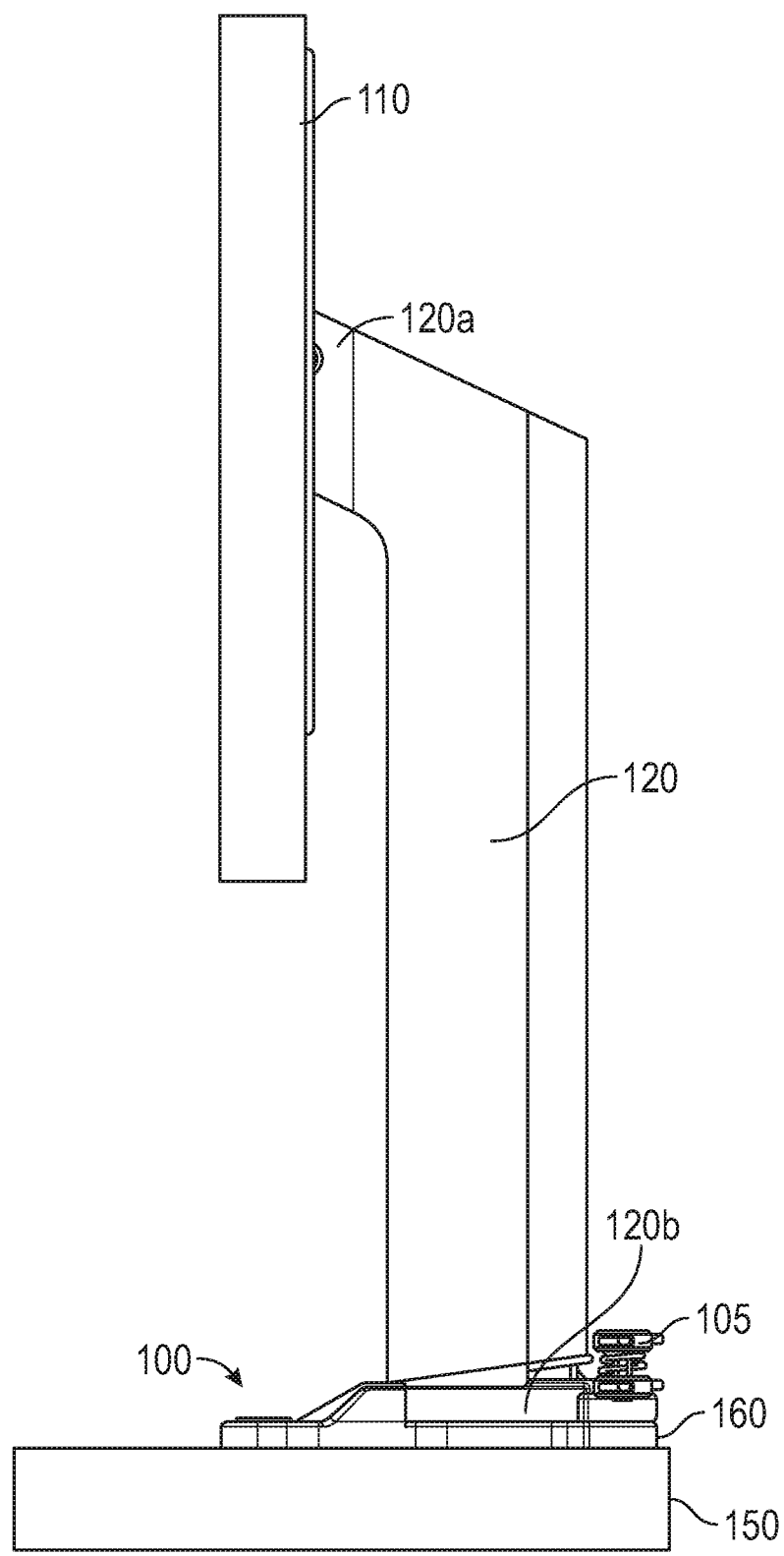
FIG. 1 shows a side view of a display arm removably coupled to a housing with an apparatus in accordance with various examples.

Referring now to the example shown in FIG. 1, a side view of an apparatus 100 for removably attaching a display arm 120 to a housing 150 is shown. In this example, the arm 120 has first or upper end 120a attached to a display 110 and a second or lower end 120b removably attached to a mounting plate 160. The mounting plate 160, in turn, is fixably attached to the housing 150. Thus, the apparatus 100 for removably attaching the display arm 120 to the housing 150 comprises the second end 120b of the arm 120 and the mounting plate 160. In this example, the apparatus 100 also includes a pair of screws 105 (e.g., thumb screws) that aid in attaching the second end 120b of the arm 120 to the mounting plate 160. In other examples, the screws 105 may not be included and/or other means of supplemental attachment may be utilized.

Figure 2:
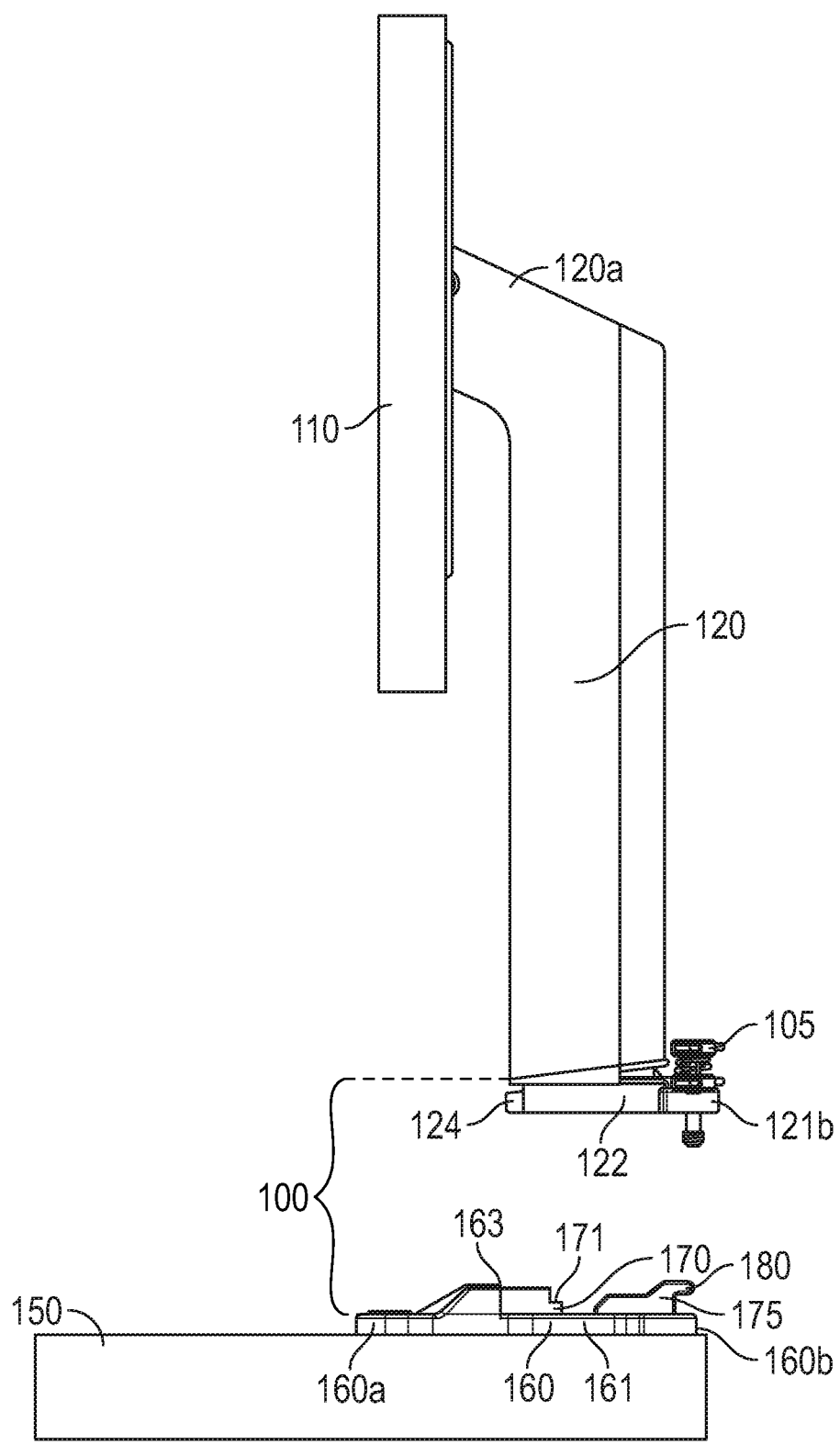
FIG. 2 shows a side view of the display arm and mounting plate of the apparatus of FIG. 1 with the display arm detached from the mounting plate, in accordance with various examples.
Figure 3:
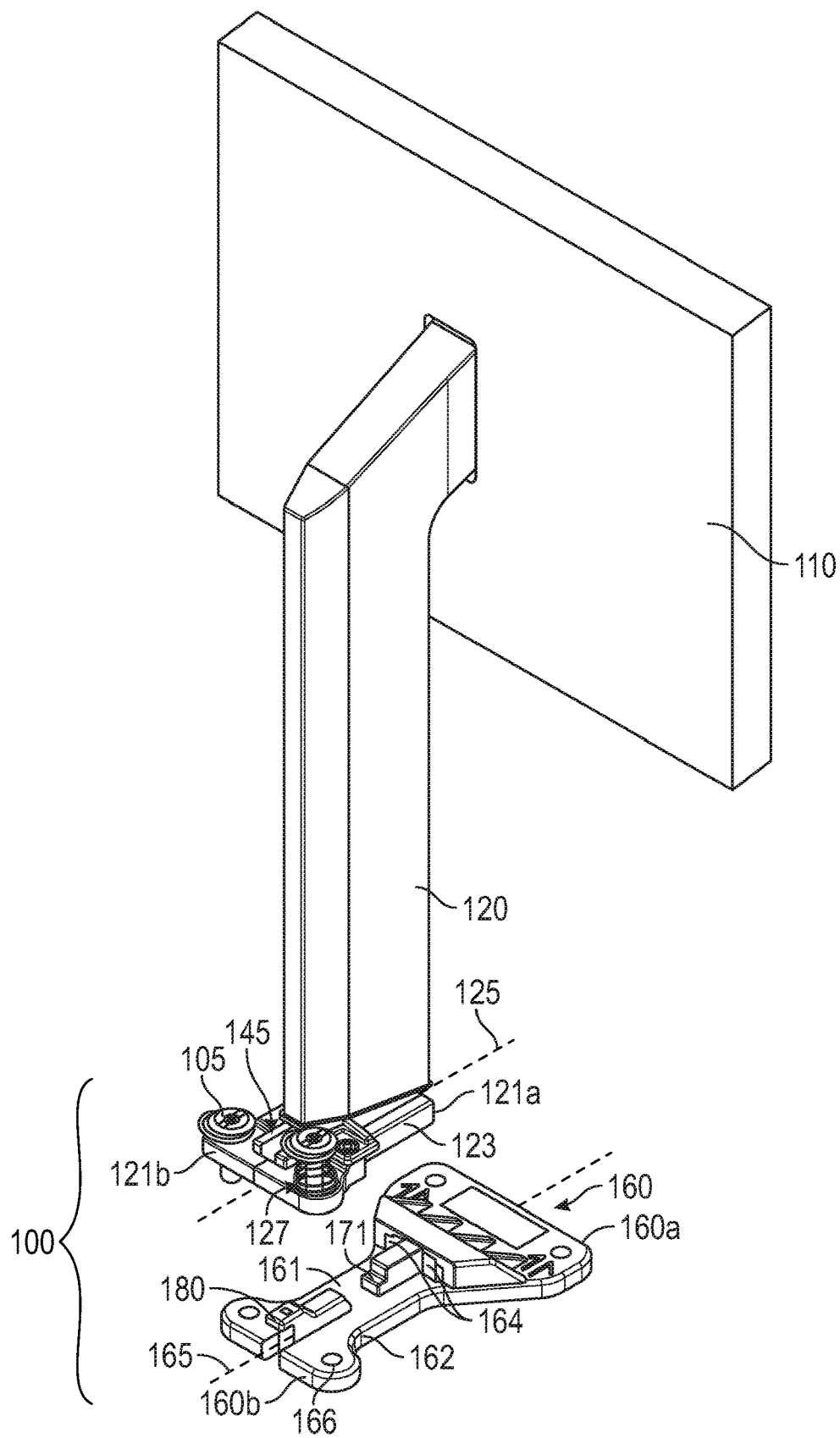
FIG. 3 shows a top, perspective view of the display arm and mounting plate of the apparatus of FIG. 1 with the display arm detached from the mounting plate, in accordance with various examples.
Figure 5:
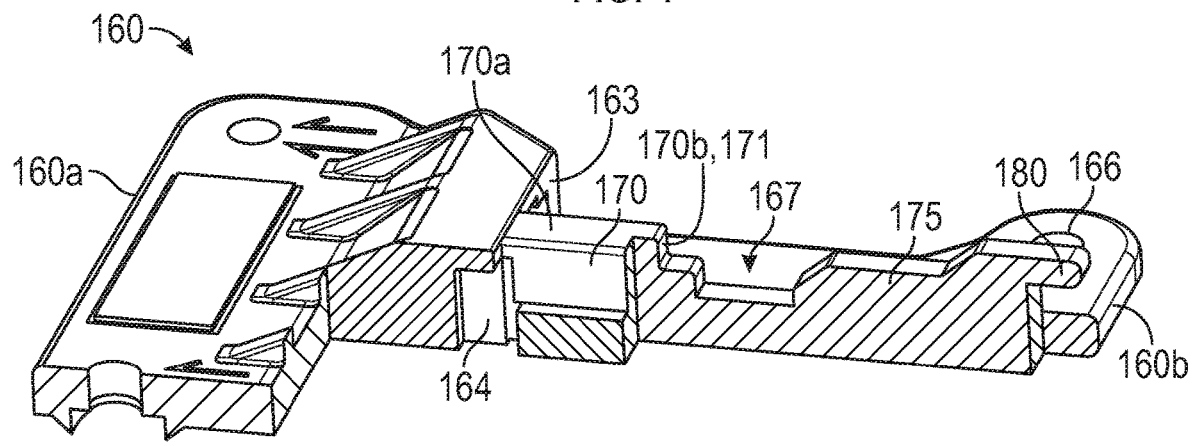
FIG. 5 shows an enlarged, partial, cross-sectional view of the mounting plate of FIG. 1, in accordance with various examples.
Figure 6A:
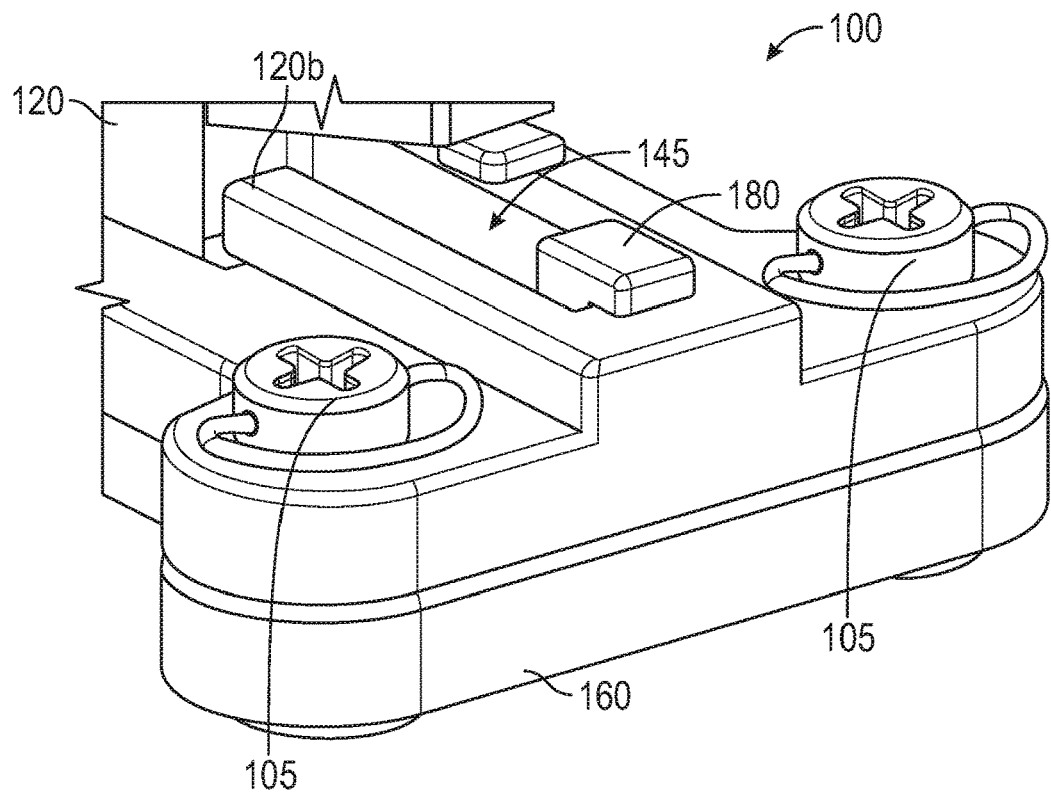
FIG. 6A shows a partial, perspective view of the second end of the display arm and the mounting plate of FIG. 1, in accordance with various examples.
Figure 6B:
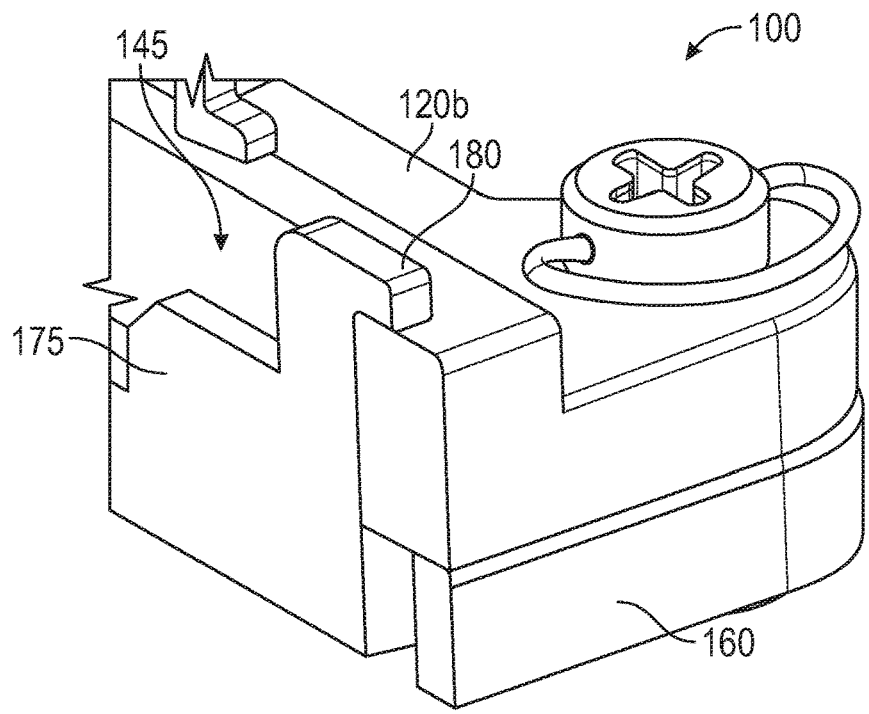
FIG. 6B shows a partial, cross-sectional view of the second end of the display arm and the mounting plate of FIG. 6A, in accordance with various examples.

Referring now to the examples shown in FIGS. 2, 3, and 5, the mounting plate 160 has a central or longitudinal axis 165, a first or front end 160a, and a second or back end 160b opposite the front end 160a. The front end 160a generally faces in the same axial direction (relative to axis 165) as the display 110, whereas the back end 160b generally faces in the opposite axial direction (relative to axis 165). In addition, the mounting plate 160 has lateral sides 161, 162 that extend axially between ends 160a, 160b. In these examples, the mounting plate 160 is generally symmetric across a vertical plane containing the axis 165.

Referring still to the examples shown in FIGS. 2, 3, and 5, the mounting plate 160 includes a shoulder 163, a first ridge 170, a second ridge 175, and a hook 180. The shoulder 163, the first ridge 170, the second ridge 175, and the hook 180 are axially arranged one beside the other along the upper surface of the mounting plate 160. In addition, the shoulder 163, the first ridge 170, the second ridge 175, and the hook 180 are sized and arranged to engage mating features on the second end 120b of the arm 120.

In these examples, the shoulder 163 is axially positioned proximal the first end 160a. In addition, the shoulder 163 comprises a generally planar, vertical surface extending laterally between sides 161, 162. Laterally-spaced receptacles 164 extend axially into the shoulder 163 generally toward the front end 160a. The receptacles 164 are located equidistant from the central axis 165 of the mounting plate 160.

In these examples, the first ridge 170 extends axially from the shoulder 163 toward the back end 160b. Thus, the first ridge 170 may be described as having a first end 170a at the shoulder 163 and a second end 170b distal the shoulder 163 (FIG. 5). The second end 170b of the shoulder 163 includes a step profile 171 comprising a step formed by a vertical planar surface that intersects a horizontal planar surface. In these examples, the first ridge 170 has a rectangular cross-sectional geometry, and further, the first ridge 170 is laterally centered on the mounting plate 160. Thus, the first ridge 170 extends from the middle of the shoulder 163 toward the back end 160b. The receptacles 164 are positioned on opposite sides of the first ridge 170.

Referring still to the examples shown in FIGS. 2, 3, and 5, the second ridge 175 is axially positioned between the first ridge 170 and the back end 160b, and the second ridge 175 is axially spaced from the first ridge 170. In these examples, the second ridge 175 is coaxially aligned with the first ridge 170, and thus, the second ridge 175 is laterally centered on the mounting plate 160. Due to the axial spacing of the ridges 170, 175, a recess 167 is axially positioned between the ridges 170, 175.

In these examples, the hook 180 extends from the second ridge 175 proximal the back end 160b. In these examples, the hook 180 has an L-shape including a first portion extending vertically upward from the second ridge 175 proximal the back end 160b and a second portion extending axially from the first portion toward the second end 160b. The hook 180 is disposed at a slightly greater height than the shoulder 243, the first ridge 245, and the second ridge 246. In these examples, the second ridge 175 has a rectangular cross-sectional geometry.

The back end 160b of the mounting plate 160 includes a pair of laterally spaced, internally threaded bores 166. In these examples, the bores 166 are disposed on opposite sides of the second ridge 175. Each bore 166 is sized to threadably receive one of the screws 105.

Referring still to the examples shown in FIGS. 2, 3, and 5, the lower end 120b of the display arm 120 is sized and arranged to mate and engage the mounting plate 160. In particular, the lower end 120b of the display arm 120 has a central or longitudinal axis 125, a first or front end 121a, and a second or back end 121b opposite the front end 121a. The front end 121a generally faces in the same axial direction (relative to axis 125) as the display 110, whereas the back end 121b generally faces in the opposite axial direction (relative to axis 125). When the lower end 121b is coupled to the mounting plate 160, the front end 121a is positioned proximal the front end 160a, and the back end 121b is positioned proximal the back end 160b. In addition, the lower end 120b has lateral sides 122, 123 that extend axially between ends 121a, 121b. In this example, the lower end 120b is generally symmetric across a vertical plane containing the axis 125.

Figure 4:
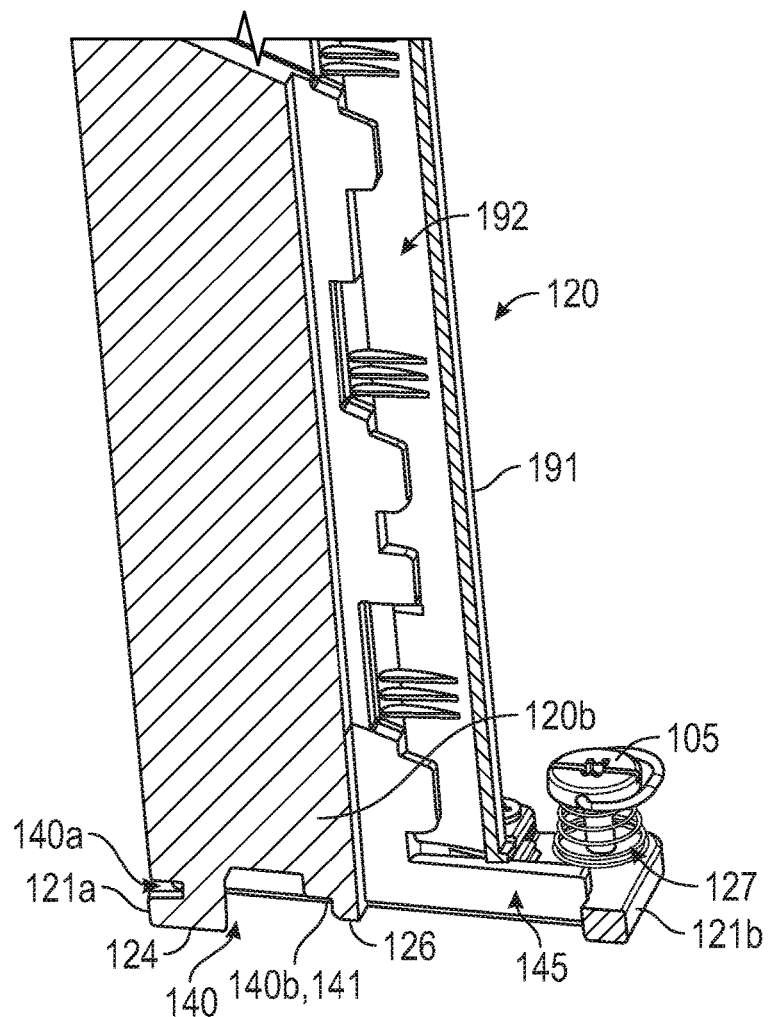
FIG. 4 shows an enlarged, partial, cross-sectional view of the second end of the display arm of FIG. 1, in accordance with various examples.

Referring now to the examples shown in FIGS. 2, 3, and 4, the lower end 120b of the display arm 120 includes a pair of tabs 124, a recess 140, and an elongate slot 145. The tabs 124, the recess 140, and the slot 145 are axially arranged one beside the other along the lower surface of the lower end 120b. In addition, the tabs 124 are sized and arranged to slidingly engage the receptacles 164, the recess 140 is sized and arranged to slidingly engage the first ridge 170, and the slot 145 is sized and arranged to slidingly engage the second ridge 175 and the hook 180.

In these examples, the tabs 124 have an L-shaped geometry and are disposed at the front end 121a. In addition, the tabs 124 are sized to mate with the receptacles 164 in the shoulder 163.

The recess 140 extends axially from the front end 121a and is laterally positioned between the tabs 124. Thus, the tabs 124 are positioned on opposite sides of the recess 140. In addition, the recess 140 may be described as having a first end 140a at the front end 121a and a second end 140b distal the front end 121a (FIG. 4). The second end 140b of the recess 140 includes a step profile 141 comprising a step formed by a vertical planar surface that intersects a horizontal planar surface. Step profile 141 is sized to mate and engage step profile 171 of the mounting plate 160. In these examples, the recess 140 has a rectangular cross-sectional geometry, and further, the recess 140 is laterally centered on the lower end 120b of the display arm 120.

Referring now to the example shown in FIG. 4, the elongate slot 145 is axially positioned between the recess 140 and the back end 121b, and is axially spaced from the recess 140. In this example, the slot 145 is coaxially aligned with the recess 140, and thus, the slot 145 is laterally centered along the lower end 120b. Due to the axial spacing of the recess 140 and the slot 145, a downwardly extending projection 126 is axially positioned between the recess 140 and the slot 145.

In this example, the back end 121b of the lower end 120b of the display arm 120 includes a pair of laterally spaced throughbores 127 through which screws 105 may extend. In this example, the bores 127 are disposed on opposite sides of the slot 145. Each bore 127 and the corresponding screw 105 is aligned with one of the bores 166 in the mounting plate 160 when the lower end 120b is coupled to the mounting plate 160, thereby allowing the screws 105 to be threaded into the bores 166.

Referring now to the examples shown in FIGS. 2, 3, 5, 6A, and 6B, to assemble apparatus 100 and attach the display arm 120 to the housing 150, the arm 120 is lowered toward the mounting plate 160 with the lower end 120b of the tabs 124 generally facing toward the receptacles 164 and positioned rearward of the shoulder 163, the recess 140 aligned with the first ridge 170, the step profile 141 and the projection 126 aligned with the recess 167, the second ridge 175 aligned with the slot 145, and the hook 180 aligned with the slot 145.

While maintaining alignment of these features, the arm 120 is lowered until lower end 120b engages the mounting plate 160. As lower end 120b comes into engagement with the mounting plate 160, the recess 140 slidingly receives the first ridge 170 with the tabs 124 disposed on opposite sides of the first ridge 170, the recess 167 receives the step profile 141 and the projection 126, and the elongate slot 145 slidingly receives the second ridge 175 and the hook 180. The axial length of the recess 140 is greater than the axial length of the first ridge 170; however, the lateral width of the recess 140 is substantially the same as the lateral width of the first ridge 170. Thus, when the first ridge 170 is received within the recess 140, the vertically oriented lateral sides of the first ridge 170 slidingly engage vertically oriented surfaces within the lower end 120b of the arm 120 defining the recess 140, thereby preventing the arm 120 from moving laterally relative to the mounting plate 160 and resisting the lateral tipping of the arm 120 relative to the mounting plate 160. Similarly, the axial length of the slot 145 is greater than the axial length of the second ridge 175 and the hook 180; however, the lateral width of the slot 145 is substantially the same as the lateral width of the second ridge 175 and the hook 180. Thus, when the second ridge 175 and the hook 180 are received within the slot 145, the vertically oriented lateral sides of the second ridge 175 and the hook 180 slidingly engage the vertically oriented surfaces within the lower end 120b of the arm 120 defining the slot 145, thereby preventing the arm 120 from moving laterally relative to the mounting plate 160 and resisting the lateral tipping of the arm 120 relative to the mounting plate 160.

Next, in these examples, the arm 120 and the lower end 120b are moved axially forward relative to the mounting plate 160 to slide the tabs 124 into mating receptacles 164, move step profile 141 into engagement with mating step profile 171, and move the hook 180 over the back end 160b of the mounting plate 160. The seating of the tabs 124 within the receptacles 164, the engagement of step profiles 141, 171, and the positioning of the back end 160b under hook 180 prevents the arm 120 from moving axially forward relative to the mounting plate 160 and resists the forward or rearward tipping of the arm 120 relative to the mounting plate 160. The seating of the tabs 124 within the receptacles 164, the engagement of step profiles 141, 171, and the positioning of the back end 160b under hook 180 does not prevent the arm 120 from moving axially backward relative to the mounting plate 160. However, when the tabs 124 are seated within the receptacles 164 and the step profiles 141, 171 are seated against each other, the screws 105 are aligned with the bores 166, and then the screws 105 are threaded into bores 166 to removably secure the arm 120 to the mounting plate 160 and the housing 150. Once screws 105 are sufficiently tightened, the arm 120 cannot move translationally or rotationally relative to the mounting plate 160. The snug sliding engagement of the first ridge 170 and the recess 140, the tabs 124 and the receptacles 164, the step profiles 141, 171, and the second ridge 175 an the slot 145, as well as the positioning of the back end 160b under hook 180, may provide sufficient stability to the arm 120 to enable the user to completely release the arm 120 to tighten the screws 105. The decoupling of the arm 120 and the mounting plate 160 of the apparatus 100 is generally performed by performing the forgoing process in reverse.

Figure 7:
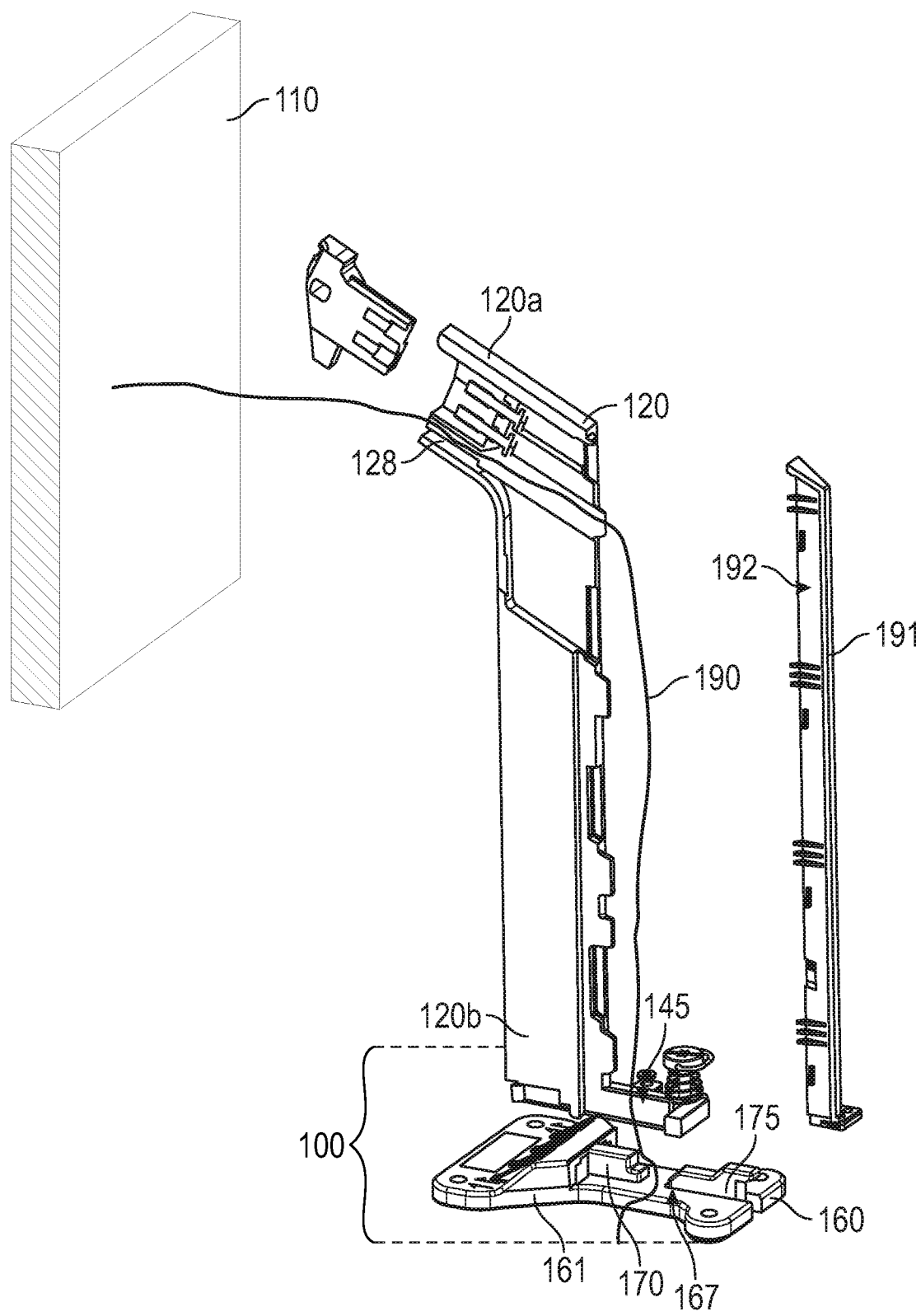
FIG. 7 shows an exploded view of the display arm and mounting plate of FIG. 1 with the back cover of the display arm removed to accommodate a cable, in accordance with various examples.

Referring briefly to FIG. 7, one or more electrical cables or wires 190 may be routed from the display 110 through the arm 120 and the apparatus 100 to the housing 150 or other device. In this example, the upper end 120a of the arm 120 includes a through passage 128 that extends from the display 110 to the back of the upper end 120a. A cover 191 is removably coupled to the back of the arm 120 and defines a cavity 192 extending vertically from the upper end 120a to the lower end 120b. The cable(s) 190 extend from the display 110 through the passage 128 and the cavity 192 to the apparatus 100. In addition, the cable(s) 190 extend through the elongated slot 145 in the lower end 120b of the arm 120, the recess 167 between the ridges 170, 175, and then around the lateral side 161 of the mounting plate 160. To detach the cable cover 191 from the arm 120, a pair of screws attaching cable cover 191 to the mounting plate 160 are remove, and then the cable cover 191 is slid upward relative to the arm 120 to provide access to the cable(s) 190 and the cavity 192. With the cable cover 191 removed, the cable(s) 190 can be routed through the passage 128 and the cavity 192 along the back of the arm 120, and through the apparatus 100 as previously described. With the cable(s) 190 routed, the cable cover 191 can be reattached to the arm 120, thereby hiding the cable(s) 190 from view.

Figure 8:
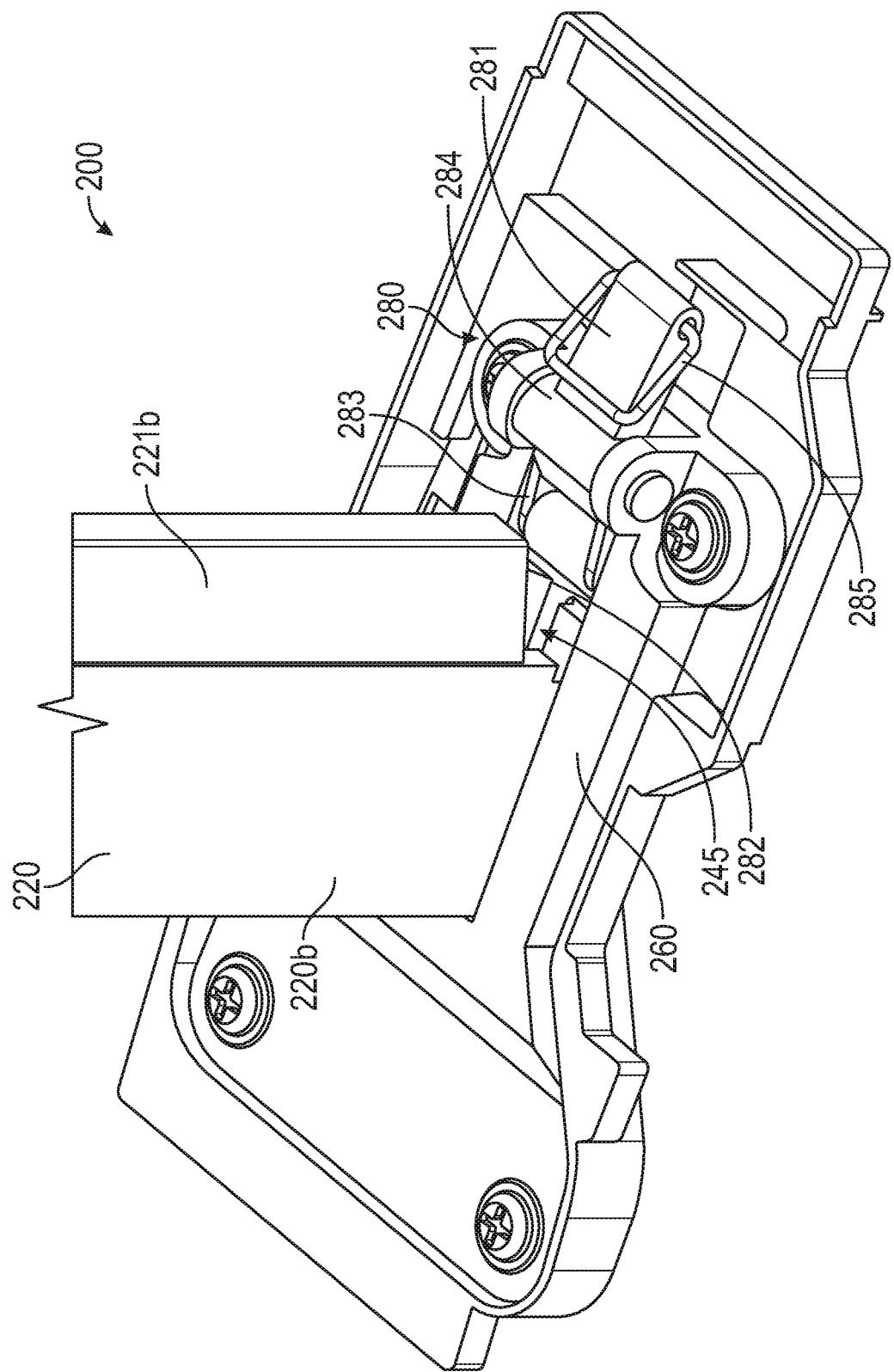
FIG. 8 shows a partial, perspective view of a display arm removably coupled to a housing with an apparatus, in accordance with various examples.

Referring now to FIG. 8, an enlarged partial, perspective view of another example of an apparatus 200 for removably attaching a display arm 220 to a mounting plate 260 is shown. The arm 220 comprises a lower end 220b that engages the mounting plate 260 to form the apparatus 200. In this example, the lower end 220b of the arm 220 is substantially the same as the lower end 120b previously described with the exception that the elongate slot 145 is replaced with a socket 245 at the back end 221b of the lower end 220b. Thus, the lower end 220b includes shoulder 163, the receptacles 164, the first ridge 170, the step profile 171, and the recess 167, each as previously described. Further, in this example, the mounting plate 260 is substantially the same as the mounting plate 160 previously described with the exception that the second ridge 175 and the hook 180 are replaced by a latch assembly 280. Thus, the mounting plate 160 includes the tabs 124, the recess 140, and the projection 126, each as previously described.

Figure 9A:
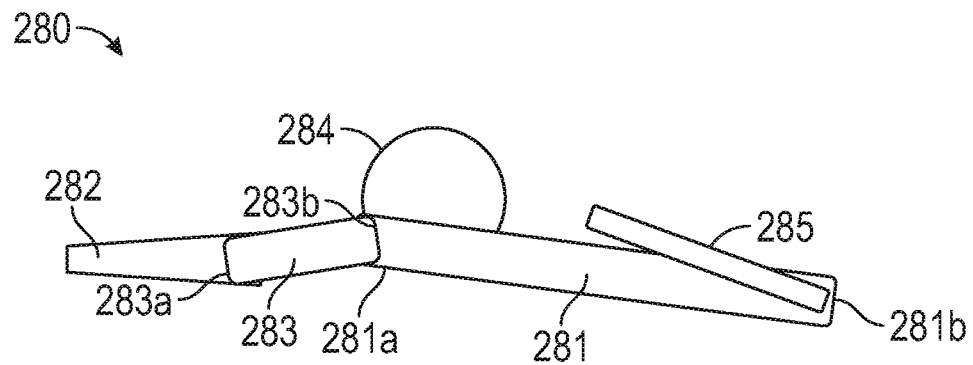
FIGS. 9A and 9B show side schematic views of the latch assembly of FIG. 8, in accordance with various embodiments.
Figure 9B:
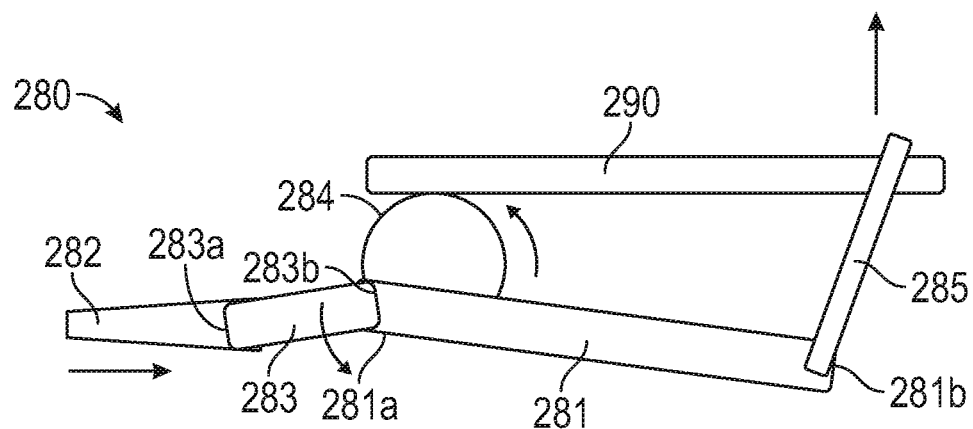

Referring now to FIGS. 8, 9A, and 9B, in this example, the latch assembly 280 includes a lever arm 281, a latch 282, and a linkage 283 coupled to the arm 281 and the latch 282. The lever arm 281 has a first end 281a fixably attached to a pin 284 and a second end 281b distal the pin 284. The pin 284 is rotatably coupled to the mounting plate 260 such that the pin 284 can pivot about a horizontal axis relative to the mounting plate 260. Thus, the lever arm 281 can pivot or rotate up and down about end 281a relative to the mounting plate 260. The second end 281b of the lever arm 281 is attached to the lower portion of the pin 284 and positioned below the axis of rotation of the pin 284, and thus, when the second end 281b of the lever arm 281 is lifted upward, the first end 281a rotates down and away from the lower end 220b of the arm 220, and when the second end 281b of the lever arm 281 is pushed downward, the first end 281a rotates upward and toward the lower end 220b of the arm 220. A lifting member 285 is pivotally coupled to the second end 281b of the lever arm 281 and can be used to increase the lifting force applied to the end 281b to increase the rotational torque applied to the first end 281a and the pin 284.

The linkage 283 extends between the lever arm 281 and the latch 282. In particular, the linkage 283 has a first end 283a pivotally coupled to the latch 282 and a second end 283b pivotally coupled to the end 281a of the lever arm 281. The linkage 283 coverts the rotational movement of the end 281a to the linear movement of the latch 282. Thus, the latch 282, the linkage 283, and the lever arm 281 are movably coupled to the mounting plate 260—the latch 282 can generally move horizontally relative to the mounting plate 260, the linkage 283 can move horizontally and pivot relative to the mounting plate 260, and the lever arm 281 can pivot relative to the mounting plate 260.

Referring still to FIGS. 8, 9A, and 9B, the second end 281b of the lever arm 281 is pivoted down and up to move the latch 282 into and out of, respectively, the socket 245 at the back end 221b of the arm 220. For example, to move the latch 282 into the socket 245, the second end 281b of the lever arm 281 is pushed downward, thereby moving the first end 281a upward and toward the lower end 220b of the arm 220. The horizontal component of the movement of the first end 281a toward the arm 220 is transferred to the latch 282 by the linkage 283, thereby urging the latch 282 into the socket 245. To remove the latch 282 from the socket 245, the second end 281b of the lever arm 281 is raised upward, thereby moving the first end 281a downward and away from the lower end 220b of the arm 220. The horizontal component of the movement of the first end 281a away from the arm 220 is transferred to the latch 282 by the linkage 283, thereby pulling the latch 282 from the socket 245.

Due to the arrangement of the linkage 283 and the position of the end 281a of the lever arm 281 disposed below the rotational axis of the pin 284 and extending slightly beyond the pin 284, the latch 282 is generally biased or urged to remain seated within the socket 245. As best shown in FIG. 9B, in this example, the torque applied to the pin 284 and the end 281a to facilitate the removal of the latch 282 from the socket 245 can be enhanced with an elongate tool 290 such as a screw driver or key. Specifically, the tool 290 is passed through the lifting member 285 and positioned on top of the pin 284. Then, the end of the tool 290 distal the pin 284 is lifted to exert an upward force on the lifting member 285 and the end 281b of the lever arm 281.

In this example, the apparatus 200 is assembled in substantially the same manner as the apparatus 100 previously described with the exception that the latch 282 is seated in the socket 245 as described above instead of the engagement of the screws 105 and bores 166, as well as the engagement of the hook 180 and back end 160b.

The above discussion is meant to be illustrative of the principles and various examples of the present disclosure.

Numerous variations and modifications of the foregoing examples are contemplated. It is intended that the following claims be interpreted to embrace all such variations and modifications.

What is claimed is:

1. A connector apparatus, comprising:
a housing;
a mounting plate to fixably attach to the housing, wherein the mounting plate has a central axis, a first end, a second end opposite the first end, a first lateral side extending axially from the first end to the second end, and a second lateral side extending axially from the first end to the second end
wherein the mounting plate comprises:
a shoulder and a first receptacle to slidingly receive a first tab on an end of an arm coupled to a display, wherein the shoulder extends laterally from the first lateral side to the second lateral side and the first receptacle extends axially into the shoulder; and
a first ridge to seat in a recess on the arm, wherein the first ridge extends axially from the shoulder toward the second end of the mounting plate, and wherein the first ridge comprises a step profile to engage a mating step profile on the arm.

2. The apparatus of claim 1, wherein the mounting plate further comprises a hook to extend through an elongate slot on the end of the arm.

3. The apparatus of claim 1, further comprising a latch to seat in a socket on the end of the arm, wherein the latch is movably coupled to the mounting plate.

4. The apparatus of claim 1, wherein the mounting plate further comprises a second receptacle to slidingly receive a second tab on the end of the arm, wherein the second receptacle extends axially into the shoulder.

5. The apparatus of claim 4, wherein the first ridge is laterally positioned between the first receptacle and the second receptacle.

6. The apparatus of claim 5, wherein the first ridge has a first end axially adjacent the shoulder and a second end axially distal the shoulder, and wherein the step profile is positioned on the second end of the first ridge.

7. The apparatus of claim 5, further comprising a second ridge to seat in an elongate slot on the end of the arm, wherein the second ridge is axially positioned between the first ridge and the second end of the mounting plate.

8. A connector apparatus, comprising:
a mounting plate to fixably attach to a housing, wherein the mounting plate has a central axis, a first end, a second end opposite the first end, a first lateral side extending axially from the first end to the second end, and a second lateral side extending axially from the first end to the second end,
wherein the mounting plate comprises:
a first receptacle to slidingly receive a first tab on an end of an arm coupled to a display;
a second receptacle to slidingly receive a second tab on the end of the arm, wherein the first receptacle and the second receptacle extend axially into the mounting plate;
a first ridge extending axially toward the second end of the mounting plate;
a second ridge axially aligned with and spaced from the first ridge; and
a recess axially positioned between the first ridge and the second ridge that is to receive a projection on the arm.

9. The apparatus of claim 8, wherein the mounting plate further comprises a hook to extend through an elongate slot on the end of the arm.

10. The apparatus of claim 9, wherein the first ridge is to seat in the elongate slot on the end of the arm.

11. The apparatus of claim 8, further comprising a latch to seat in a socket on the end of the arm, wherein the latch is movably coupled to the mounting plate.

12. The apparatus of claim 8, wherein the second ridge is to seat in a recess on the end of the arm, and wherein the second ridge is laterally positioned between the first receptacle and the second receptacle.

13. A connector apparatus, comprising:
a mounting plate to fixably attach to a housing, wherein the mounting plate has a central axis, a first end, a second end opposite the first end, a first lateral side extending axially from the first end to the second end, and a second lateral side extending axially from the first end to the second end,
wherein the mounting plate comprises:
a shoulder;
a first ridge to slidingly mate with a first recess on an end of an arm coupled to a display, wherein the first ridge extends axially from the shoulder, and wherein the first ridge corn rises a steo orofile to engage a mating step profile on the arm;
a second ridge axially aligned with and spaced from the first ridge;
a recess axially positioned between the first ridge and the second ridge that is to receive a projection on the arm; and
a hook to extend through an elongate slot on the end of the arm, wherein the hook extends from the second ridge.

14. The apparatus of claim 13, wherein the mounting plate further comprises a first receptacle to receive a first tab on the end of the arm and a second receptacle to receive a second tab on the end of the arm.

15. The apparatus of claim 14, wherein the second ridge is to mate with the elongate slot on the end of the arm, and wherein the first ridge and the second ridge are laterally positioned between the first receptacle and the second receptacle.

* * * * *